US011112775B2

(12) United States Patent
Nakada et al.

(10) Patent No.: US 11,112,775 B2
(45) Date of Patent: Sep. 7, 2021

(54) SYSTEM AND METHOD OF DETERMINING PROCESSING CONDITION

(71) Applicant: HITACHI, LTD., Tokyo (JP)

(72) Inventors: Hyakka Nakada, Tokyo (JP); Takeshi Ohmori, Tokyo (JP); Tatehito Usui, Tokyo (JP); Masaru Kurihara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 174 days.

(21) Appl. No.: 16/430,844

(22) Filed: Jun. 4, 2019

(65) Prior Publication Data

US 2019/0369605 A1 Dec. 5, 2019

(30) Foreign Application Priority Data

Jun. 5, 2018 (JP) .............................. JP2018-107419

(51) Int. Cl.
*G05B 19/41* (2006.01)
*G05B 19/418* (2006.01)
*G05B 13/02* (2006.01)

(52) U.S. Cl.
CPC ... *G05B 19/41805* (2013.01); *G05B 13/0265* (2013.01); *G05B 2219/33034* (2013.01);
(Continued)

(58) Field of Classification Search
CPC .......... G05B 19/41805; G05B 13/0265; G05B 2219/33034; G05B 2219/45028; G05B 2219/45031
(Continued)

(56) References Cited

U.S. PATENT DOCUMENTS 4,130,867 A 12/1978 Bachman et al.
6,552,340 B1 4/2003 Krivanek et al.
(Continued)

FOREIGN PATENT DOCUMENTS

JP 2002-510431 A 4/2002
JP 2006-114304 A 4/2006
(Continued)

OTHER PUBLICATIONS

P. Hawkes, "Advances in Imaging and Electron Physics vol. 153 Abberration-corrected Electron microscopy", Academic Press, p. 63 (2008).

*Primary Examiner* — Rocio Del Mar Perez-Velez
*Assistant Examiner* — Christopher W Carter
(74) *Attorney, Agent, or Firm* — Miles & Stockbridge, P.C.

(57) ABSTRACT

A system for determining a processing procedure including a plurality of processes for controlling an object, the system includes a learning unit for performing a learning process for determining a processing condition of each of a plurality of processes, and the learning unit acquires a physical quantity correlating with a state of the object on which a process has been performed under a predetermined processing condition, from a device for controlling the object on the basis of the processing procedure, calculates a pseudo state corresponding to the state of the object on the basis of the physical quantity, performs a learning process using a value function, and determines a processing condition of each of the plurality of processes to achieve a target state of the object.

10 Claims, 9 Drawing Sheets

(52) U.S. Cl.
CPC .............. *G05B 2219/45028* (2013.01); *G05B 2219/45031* (2013.01)

(58) Field of Classification Search
USPC .......................................................... 700/47
See application file for complete search history.

(56) References Cited

U.S. PATENT DOCUMENTS

| | | |
|---|---|---|
| 6,605,810 B1 | 8/2003 | Haider et al. |
| 6,646,267 B1 | 11/2003 | Haider et al. |
| 7,283,435 B2 | 10/2007 | Kuze et al. |
| 7,372,583 B1 | 5/2008 | Jin et al. |
| 7,838,858 B2 | 11/2010 | Okita |
| 8,031,565 B2 | 10/2011 | Isshiki |
| 2007/0120055 A1 | 5/2007 | Sawada et al. |
| 2008/0255786 A1 | 10/2008 | Jin et al. |
| 2008/0255801 A1 | 10/2008 | Jin et al. |
| 2014/0231666 A1 | 8/2014 | Akima et al. |
| 2018/0260712 A1* | 9/2018 | Hatada ................... B23K 26/38 |

FOREIGN PATENT DOCUMENTS

| | | |
|---|---|---|
| JP | 2007-180013 A | 7/2007 |
| JP | 2007-266008 A | 10/2007 |
| JP | 2009044125 A | 2/2009 |
| JP | 2010-218591 A | 9/2010 |
| JP | 2013030278 A | 2/2013 |

\* cited by examiner

FIG. 4

| PROCESSING STEP 401 | PSEUDO STATE 402 | PROCESSING CONDITION 403 | REWARD 404 |
|---|---|---|---|
| 1 | (2042.3,1888.0,3205.7) | PRESSURE (Pa) :5.4<br>POWER (W) :750<br>BIAS (W) :32<br>GAS A (sccm) :120<br>GAS B (sccm) :10<br>... | 10 |
| 2 | (2022.1,1928.3,2961.4) | PRESSURE (Pa) :6.8<br>POWER (W) :820<br>BIAS (W) :20<br>GAS A (sccm) :85<br>GAS B (sccm) :0<br>... | 7 |
| ... | ... | ... | ... |
| T | (2103.2,1879.1,3166.8) | PRESSURE (Pa) :9.8<br>POWER (W) :850<br>BIAS (W) :35<br>GAS A (sccm) :100<br>GAS B (sccm) :12<br>... | 5 |

| WAVELENGTH | INTENSITY |
|---|---|
| h1 | 1669.1 |
| h2 | 2008.3 |
| h3 | 2407.4 |
| h4 | 3088.5 |
| h5 | 2511.0 |
| ⋮ | ⋮ |

FIG. 7B

| PRINCIPAL COMPONENT | STATE VALUE |
|---|---|
| FIRST PRINCIPAL COMPONENT | 2042.3 |
| SECOND PRINCIPAL COMPONENT | 1888.0 |
| THIRD PRINCIPAL COMPONENT | 3205.7 |

*FIG. 10*

```
┌─────────────────────────────────────────────────────────────┐ 1000
│                         INPUT SCREEN                        │
│  1060      1010                                             │
│   ╭──────────────────────────────────────────────────╮      │
│   │            LEARNING PROCESS SETTING              │      │
│   │       1011                    1012               │      │
│   │  ▼ VALUE FUNCTION       ▼ REINFORCEMENT LEARNING │      │
│   │  ☑ LINEAR REGRESSION    ☑ Q-LEARNING             │      │
│   │  ☐ NN                   ☐ SARSA                  │      │
│   │  ☐ KRR                  ☐ Actor-critic           │      │
│   ╰──────────────────────────────────────────────────╯      │
│                                                             │
│  1060   1020                    1060   1030                 │
│   ╭──────────────────────╮       ╭──────────────────────╮   │
│   │  PSEUDO STATE SETTING│       │    REWARD SETTING    │   │
│   │    1021              │       │     1031             │   │
│   │  ▼ PSEUDO STATE      │       │  ▼ REWARD            │   │
│   │  ☑ INTERFERENCE LIGHT│       │  ☑ FREQUENCY OF      │   │
│   │    (WAVELENGTH SPEC.)│       │    INTERFERENCE LIGHT│   │
│   │  ☐ INTERFERENCE LIGHT│       │  ☐ PROCESSED SHAPE   │   │
│   │    (PCA)             │       │  ☐ COMBINATION       │   │
│   │  ☐ DEVICE DATA       │       │                      │   │
│   ╰──────────────────────╯       ╰──────────────────────╯   │
│                                                             │
│  1060   1040                    1060   1050                 │
│   ╭──────────────────────╮       ╭──────────────────────╮   │
│   │ PROCESSING PROCEDURE │       │ VALUE FUNCTION UPDATE│   │
│   │       SETTING        │       │       SETTING        │   │
│   │    1041              │       │     1051             │   │
│   │  ▼ PROCESSING        │       │  ▼ UPDATE FREQUENCY  │   │
│   │    PROCEDURE         │       │  ☐ EVERY STEP        │   │
│   │  [10] NUMBER OF      │       │  ☐ EVERY SAMPLE      │   │
│   │       PROCESSING     │       │  ☑ EVERY PLURALITY   │   │
│   │       STEPS          │       │    OF SAMPLES : [15] │   │
│   │  [10s] PROCESSING    │       │                      │   │
│   │        TIME          │       │                      │   │
│   ╰──────────────────────╯       ╰──────────────────────╯   │
│                                                     1070    │
│                                                   ┌───────┐ │
│                                                   │ ENTER │ │
│                                                   └───────┘ │
└─────────────────────────────────────────────────────────────┘
```

SYSTEM AND METHOD OF DETERMINING PROCESSING CONDITION

CLAIM OF PRIORITY

The present application claims priority from Japanese patent application JP 2018-107419 filed on Jun. 5, 2018, the content of which is hereby incorporated by reference into this application.

BACKGROUND OF THE INVENTION

1. Field of the Invention

The present invention relates to a system and a method of determining a processing condition which determine processing conditions of processes constituting a processing procedure of a semiconductor manufacturing process.

2. Description of the Related Art

In a semiconductor manufacturing process, desired semiconductor processing can be achieved by controlling a semiconductor processing apparatus on the basis of a processing procedure obtained in process development.

Due to the introduction of new materials constituting devices and the complication of device structures, recent semiconductor processing apparatuses have expanding control ranges and increasing control parameters. Furthermore, in order to achieve fine and complicated processing, the processing procedures of semiconductor manufacturing processes have multiple steps. Process development using such semiconductor processing apparatuses enables production of high-performance devices.

In order to fully achieve the performance of a semiconductor processing apparatus, optimization of a processing procedure, that is, optimization of a control parameter is required, and in order to achieve the optimization, know-how for process development, high operation skill, and a large number of processing experiments are required. However, due to insufficient engineers with the know-how and the skills and increasing measurements of processing results following a large number of processing tests, a longer time is required to optimize the processing procedure.

Against the above problems, it is considered that machine learning is effective to optimize the processing procedure. In related art, techniques as disclosed in JP 2009-44125 A and JP 2013-30278 A are known.

JP 2009-44125 A discloses "A profile model of the structure is obtained. The profile model is defined by profile parameters that characterize the geometric shape of the structure. A set of values for the profile parameters is obtained. A set of simulated diffraction signals is generated using the set of values for the profile parameters, each simulated diffraction signal characterizing the behavior of light diffracted from the structure. The support vector machine is trained using the set of simulated diffraction signals as inputs to the support vector machine and the set of values for the profile parameters as expected outputs of the support vector machine. After the support vector machine has been trained, a fabrication process is performed using the fabrication tool to fabricate the structure on the wafer. A measured diffraction signal of the structure is obtained. The measured diffraction signal is inputted into the trained support vector machine. Values of profile parameters of the structure are obtained as an output from the trained support vector machine. One or more process parameters or equipment settings of the fabrication tool are adjusted on the basis of the obtained values of the profile parameters".

JP 2013-30278 A discloses "The charged particle beam device includes: a charged particle beam source; a charged particle optical system that irradiates a sample with charged particles emitted from the charged particle beam source as a charged particle beam; an aberration corrector that corrects aberrations in the charged particle optical system; and a control unit that controls the components of the charged particle optical system and the aberration corrector. The charged particle beam device further includes an automatic aberration-correcting device that autonomously acquires, through leaning, optimum adjustment procedures. The automatic aberration-correcting device acquires optimum adjustment procedures with which the plurality of times of aberration correction can be simultaneously carried out through reinforcement learning".

SUMMARY OF THE INVENTION

The processing procedure usually includes a plurality of processes, and the number of control parameters to be optimized is very large. For example, a process of manufacturing an advanced device includes 10 or more steps and a processing procedure has 100 or more control parameters.

Supervised learning is a method of learning a relationship between an input and an output. When this method is applied to optimization of the control parameters, the control parameters of all processing steps are input, and a processed shape or the like of a sample is output. Therefore, analysis of a large number of parameters is required, and it is difficult to analyze the correlation between an input and an output, predict an output by using a learner, and optimize an input. Therefore, it is difficult to apply the technique described in JP 2009-44125 A.

Furthermore, in JP 2013-30278 A, the reinforcement learning is performed on condition that an environmental condition is acquired. However, in the semiconductor manufacturing process, it is necessary to take out a sample from a semiconductor processing apparatus to measure a processed shape or the like of the sample treated as a state. For example, it is difficult to directly observe a shape of a sample after etching. This is because the etching is processing performed in a vacuum chamber. Therefore, when a state of a sample cannot be directly measured, it is difficult to apply the reinforcement learning described in JP 2013-30278 A.

A representative example of the invention disclosed in the present application has the following configuration. That is, a system for determining a processing procedure including a plurality of processes for controlling an object, the system includes at least one computer including an arithmetic device, a storage device connected to the arithmetic device, and an interface connected to the arithmetic device, in which the plurality of processes is each performed on the basis of a preset processing condition, the at least one computer includes a learning unit configured to perform a learning process for determining the processing condition of each of the plurality of processes, and the learning unit acquires, from a device for controlling the object on the basis of the processing procedure, a physical quantity correlating with a state of the object for which a process included in the processing procedure is performed under a predetermined processing condition to calculate a pseudo state corresponding to the state of the object in reinforcement learning, and performs a learning process using a value function for outputting a value indicating an evaluation of the processing condition selected in an appropriate pseudo state to determine a processing condition of each of the plurality of processes for achieving a target state of the object.

According to an aspect of the present invention, even when a state cannot be directly acquired, an appropriate processing condition of each of a plurality of processes can be determined. Problems, configurations, and effects other than those described above will become apparent from the following description of the embodiments.

BRIEF DESCRIPTION OF THE DRAWINGS

FIG. 4 is a table illustrating an example of a data structure of data stored in a processing DB according to the first embodiment;

FIG. 7A is a table illustrating an example of a data structure of a pseudo state calculated by a pseudo state calculation unit according to the first embodiment;

FIG. 7B is a table illustrating an example of a data structure of a pseudo state calculated by the pseudo state calculation unit according to the first embodiment;

FIG. 10 is a diagram illustrating an example of a GUI for various settings of the analysis system according to the first embodiment.

DESCRIPTION OF THE PREFERRED EMBODIMENTS

Figure 1:
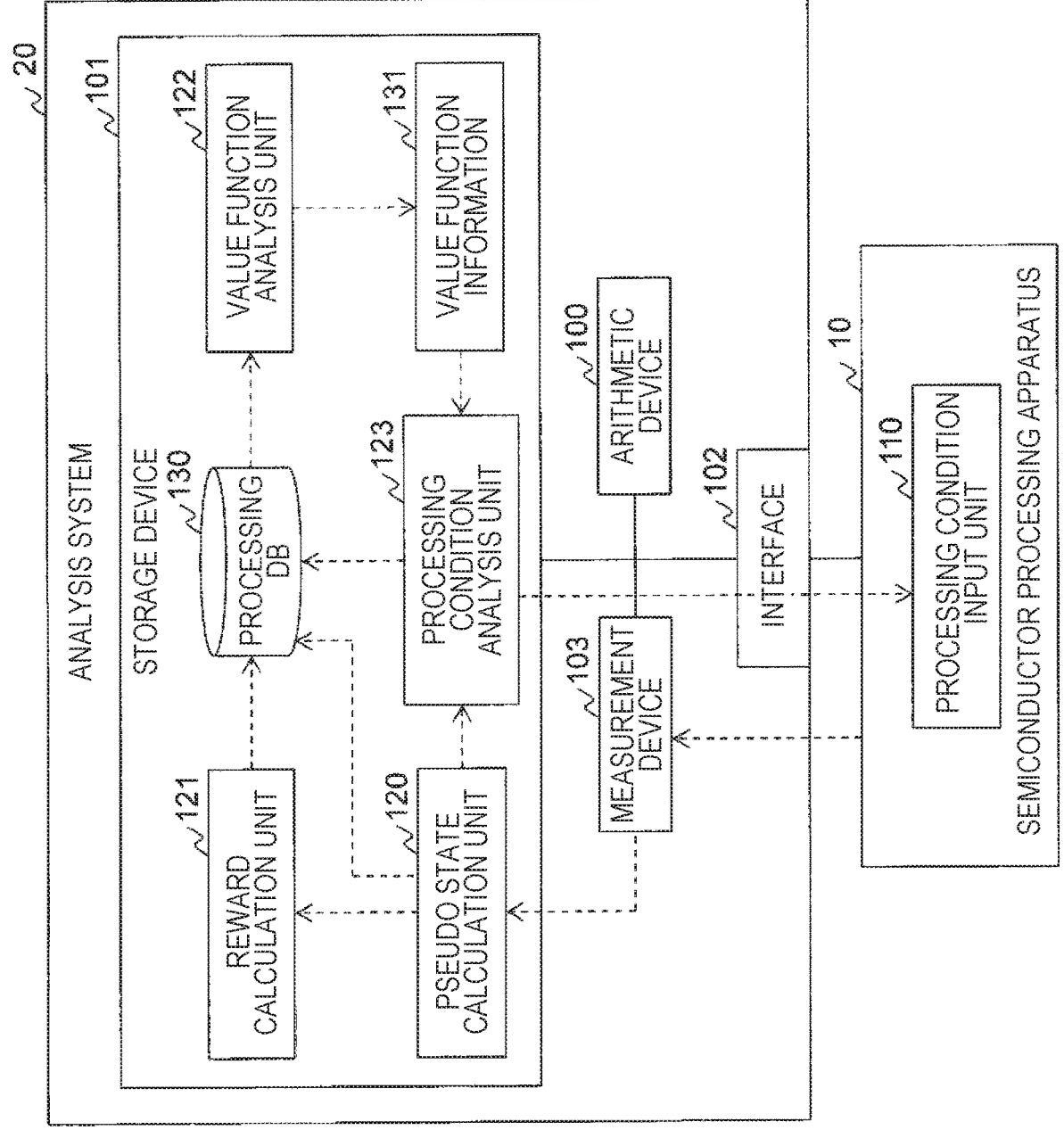
FIG. 1 is a diagram illustrating an example of a system configuration according to a first embodiment.

Embodiments of the present invention are described hereinafter with reference to the drawings. However, the present invention is not construed as being limited to the description of the embodiments described below. Those skilled in the art can easily understand that specific configurations can be changed without departing from the spirit and scope of the present invention.

The positions, sizes, shapes, ranges, and the like of configurations illustrated in the drawings and the like do not always represent actual positions, sizes, shapes, ranges, and the like, for ease of understanding of the invention. Accordingly, the present invention is not limited to the positions, sizes, shapes, ranges, and the like disclosed in the drawings and the like.

First Embodiment

A first embodiment of the present invention is described hereinafter with reference to the drawings.

FIG. 1 is a diagram illustrating an example of a system configuration according to the first embodiment.

The system includes a semiconductor processing apparatus 10 and an analysis system 20. The semiconductor processing apparatus 10 and the analysis system 20 are connected to each other directly or via a network. The network may include a local area network (LAN), a wide area network (WAN), and the like.

The semiconductor processing apparatus 10 performs processing of a sample for manufacturing a product according to a processing procedure including a plurality of processes. Each process is performed on the basis of a processing condition. The processing condition includes one or more control parameters for controlling the semiconductor processing apparatus 10. In this specification, the processes constituting the processing procedure are also referred to as processing steps.

It should be noted that the present embodiment is not limited to the type of processing performed by the semiconductor processing apparatus 10 and the contents of the processing.

The semiconductor processing apparatus 10 includes a processing condition input unit 110. The processing condition input unit 110 receives a processing condition input from the analysis system 20 and sets the processing condition in the processing apparatus. The semiconductor processing apparatus 10 processes a sample according to the processing condition set by the processing condition input unit 110. For example, the semiconductor processing apparatus 10 performs a semiconductor etching process.

Examples of the semiconductor processing apparatus 10 include processing apparatuses, such as a lithography apparatus, a film forming apparatus, a patterning apparatus, an ion implantation apparatus, a heating apparatus, and a cleaning apparatus.

Examples of the lithography apparatus include an exposure apparatus, an electron beam lithography apparatus, an X-ray lithography apparatus, and the like. Examples of the film forming apparatus include CVD, PVD, a vapor deposition apparatus, a sputtering apparatus, and a thermal oxidizer. Examples of the patterning apparatus include a wet etching apparatus, a dry etching apparatus, an electron beam processing apparatus, a laser processing apparatus, and the like. Examples of the ion implantation apparatus include a plasma doping apparatus, an ion beam doping apparatus, and the like. Examples of the heating apparatus include a resistance heating apparatus, a lamp heating apparatus, a laser heating apparatus, and the like. Examples of the cleaning apparatus include a liquid cleaning apparatus, an ultrasonic cleaning apparatus, and the like.

The analysis system 20 determines an appropriate processing condition for each of a plurality of processes included in a processing procedure by performing reinforcement learning. Examples of a reinforcement learning algorithm include temporal difference (TD) learning such as Q-learning and SARSA, a policy gradient method such as an actor-critic method, and Monte Carlo method. It should be noted that the present invention is not limited to the reinforcement learning algorithm.

When the reinforcement learning is applied to a semiconductor manufacturing process, the semiconductor processing apparatus 10 is treated as an environment, a shape of a sample is treated as a state, and the processing condition is treated as an action. In order to measure the shape of a sample, it is necessary to take out the sample from the semiconductor processing apparatus 10. Accordingly, it is difficult to acquire the shape of the sample in a processing procedure. Therefore, in the system according to the first embodiment, a pseudo state treated as the state in the reinforcement learning is calculated from a physical quantity strongly correlating with the shape of the sample (a state of the sample), and the pseudo state is used to calculate the reinforcement learning.

The analysis system 20 includes, as hardware, an arithmetic device 100, a storage device 101, an interface 102, and a measurement device 103. The analysis system 20 may include a storage device, such as a hard disk drive (HDD) or a solid state drive (SSD), input devices, such as a keyboard, a mouse, or a touch panel, and an output device, such as a display.

The arithmetic device 100 executes a program stored in the storage device 101. The arithmetic device 100 is, for example, a processor, a graphics processing unit (GPU), a field programmable gate array (FPGA), or the like. The arithmetic device 100 functions as a functional unit (module) for achieving a specific function by performing processing according to a program.

The storage device 101 stores a program executed by the arithmetic device 100 and information used for the program. Furthermore, the storage device 101 includes a work area temporarily used by the program. The storage device 101 is, for example, a volatile or nonvolatile memory. The program and information stored in the storage device 101 will be described later.

The interface 102 is an interface for connection with an external device. The interface 102 is a network interface, an IO interface, or the like.

The measurement device 103 measures a processing result from a sample processed by the semiconductor processing apparatus 10, that is, a physical quantity correlating with a shape of the sample. In the first embodiment, the measurement device 103 is incorporated in the analysis system 20, but the measurement device 103 may be incorporated in the semiconductor processing apparatus 10. Furthermore, the measurement device 103 may be configured independently of the analysis system 20.

The measurement device 103 measures a reflection, transmission, interference, absorption, and polarization spectrum of light, a laser beam, an X-ray, and the like incident on the sample, and measures a value indicating a characteristic of the sample.

Specifically, the measurement device 103 is a measurement device using an electron microscope, an optical monitor, an infrared temperature measurement device, a defect detecting device using a Kelvin probe force microscope, a prober for evaluating an electrical characteristic of an object to be processed, or the like. Furthermore, the measurement device 103 may be a device for measuring a medium, such as plasma, gas, and a liquid acting on the sample during processing and a product generated during the processing. The medium and the product do not directly represent a state of the sample. However, the medium and the product have a physical quantity that may represent a correlation with a processing condition and a processing result and can be indirectly treated as data indicating the state of the sample. In addition, the measurement device 103 may be, for example, a plasma emission monitor using optical spectrum measurement, a deposition monitor put in a processing chamber using infrared spectroscopy, a monitor displaying an atom and molecule released from a target to be processed by using a mass spectrometer, and a monitor displaying electrical characteristics by using a probe and put in the processing chamber.

In addition, the measurement device 103 may include a sensor for acquiring a power output value, such as voltage, current, and power, a value of a variable electrical element, such as a capacitor or a coil in a matching device, flow rates of various used gases, temperature of a device body and a device component, pressure in a room, an opening of a pressure control valve, a valve opening/closing state, a gas exhaust speed, operation timing and operation time of processing and a device, and the like.

Here, a program and information stored in the storage device 101 of the analysis system 20 will be described. The storage device 101 stores programs for achieving a pseudo state calculation unit 120, a reward calculation unit 121, a value function analysis unit 122, and a processing condition analysis unit 123, and further stores a processing DB 130 and value function information 131.

The processing DB 130 is a database for managing information used for the reinforcement learning. The data stored in the processing DB 130 will be described with reference to FIG. 4. Note that when the analysis system 20 is constructed by using a plurality of computers, the processing DB 130 may be achieved as a distributed database.

The value function information 131 is information for managing a value function. The value function is a function (model) for calculating a value indicating an evaluation of an action selected in an appropriate state, and is calculated on the basis of machine learning, such as a neural network, a kernel method, and a decision. In the first embodiment, the value function is a function for calculating a value of a processing condition a determined in a pseudo state s and is expressed as $Q(s,a)$. The value function $Q(s,a)$ according to the first embodiment has a variable s which is characterized by being not the state of the sample but the pseudo state correlating with the state of the sample.

Information on the value function $Q(s,a)$ estimated from an experience and a prediction is set in the value function information 131 before the reinforcement learning.

The pseudo state calculation unit 120 acquires a physical quantity measured by the measurement device 103 and calculates a pseudo state from the physical quantity. The pseudo state calculation unit 120 outputs the pseudo state to the reward calculation unit 121 and the processing condition analysis unit 123 and also stores the pseudo state in the processing DB 130.

Note that the pseudo state calculation unit 120 may directly calculate the physical quantity as the pseudo state or may calculate the pseudo state by using a formula with the physical quantity as a variable.

Note that the pseudo state calculation unit 120 may calculate, as the pseudo state, a value obtained by using reduced parameters on the basis of a dimension reduction method, such as principal component analysis (PCA). Reduction of the number of parameters enables a reduction in the amount of resource required for learning and calculation time.

In an appropriate pseudo state, the reward calculation unit 121 calculates a reward obtained by performing a processing step on the basis of a selected processing condition (action). Note that the reward can be set according to a processed shape of the sample, a purpose of processing, or the like.

The value function analysis unit 122 estimates a value function on the basis of data stored in the processing DB 130 and updates the value function information 131 on the basis of a result of the estimation. When there is no data (knowledge) for estimating a value function or when a value function having a high prediction accuracy cannot be estimated due to a small amount of accumulated data, the value function analysis unit 122 sets a value function input by user to the value function information 131 or sets a value function estimated on the basis of a random initial value to the value function information 131.

The processing condition analysis unit 123 determines a processing condition of a processing step on the basis of the pseudo state and the value function set to the value function information 131. The processing condition analysis unit 123 outputs the determined processing condition to the processing condition input unit 110 and also stores the processing condition in the processing DB 130.

Note that for each functional unit of the analysis system 20, a plurality of functional units may be integrated into one functional unit or one functional unit may be divided into a plurality of functional units according to the function. For example, the pseudo state calculation unit 120, the reward calculation unit 121, the value function analysis unit 122, and the processing condition analysis unit 123 may be achieved as one learning unit.

Figure 2:
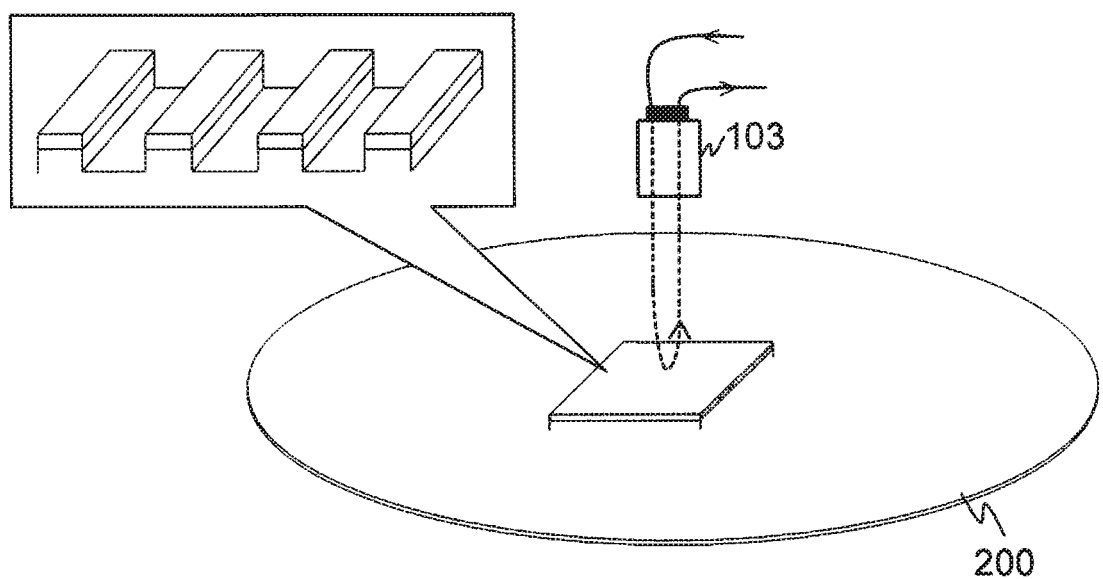
FIG. 2 is a diagram illustrating an example of a sample set in a semiconductor processing apparatus according to the first embodiment and a method of measuring a physical quantity of the sample.
Figure 3A:
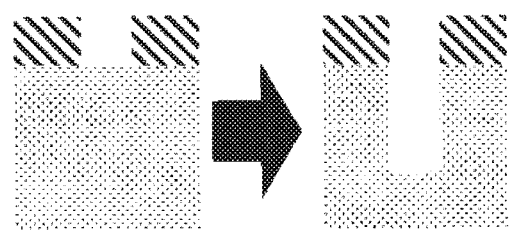
FIG. 3A is a diagram illustrating an example of processing the sample according to the first embodiment.
Figure 3B:
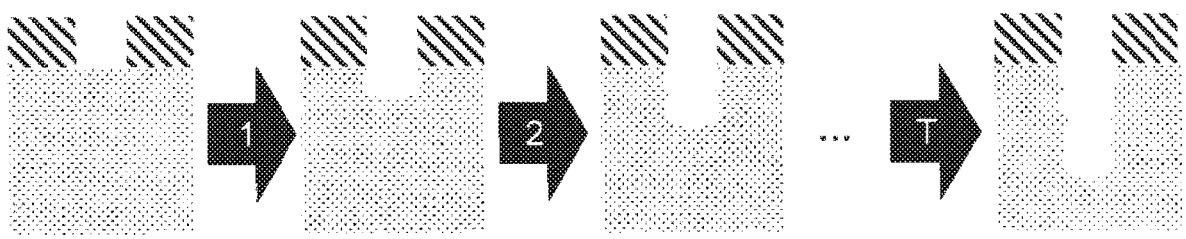
FIG. 3B is a diagram illustrating an example of a processing procedure for processing the sample according to the first embodiment.

FIG. 2 is a diagram illustrating an example of a sample set in a semiconductor processing apparatus 10 according to the first embodiment and a method of measuring a physical quantity of the sample. FIG. 3A is a diagram illustrating an example of processing the sample according to the first embodiment. FIG. 3B is a diagram illustrating an example of a processing procedure for processing the sample according to the first embodiment.

FIG. 2 illustrates a sample 200 having a pattern with a mask. The measurement device 103 illustrated in FIG. 2 is an interference spectroscope. The measurement device 103 irradiates the sample 200 with light and measures interference light generated from the sample 200. The interference light is generated due to a fine structure and a thin film of the sample 200 and is considered to be a physical quantity correlating with a geometric structure and a physical property of the sample 200.

In the first embodiment, consider a processing procedure for achieving deep vertical etching of the sample 200, as illustrated in FIG. 3A. The processing procedure for achieving the deep vertical etching of the sample 200 includes T processing steps as illustrated in FIG. 3B. Here, T is a natural number.

FIG. 4 is a table illustrating an example of a data structure of data stored in the processing DB 130 according to the first embodiment.

The processing DB 130 stores processing information 400 for each processing procedure. The processing information 400 includes an entry constituted by a processing step 401, pseudo state 402, a processing condition 403, and a reward 404. One entry corresponds to one processing step. The processing information 400 is managed in association with identification information of the processing procedure.

The processing step 401 is a field for storing identification information for identifying a processing step. In the processing step 401, for example, a number indicating a performance order of a processing step is stored. The pseudo state 402 is a field for storing a pseudo state calculated by the pseudo state calculation unit 120. The processing condition 403 is a field for storing processing conditions determined by the processing condition analysis unit 123. The reward 404 is a field for storing a reward calculated by the reward calculation unit 121.

Note that, in the processing condition 403, instead of the processing conditions determined by the processing condition analysis unit 123, processing conditions actually set by the semiconductor processing apparatus 10 may be stored. For example, the processing condition analysis unit 123 acquires processing conditions set by the semiconductor processing apparatus 10 via the interface 102, and stores the processing conditions in the processing information 400.

Figure 5:
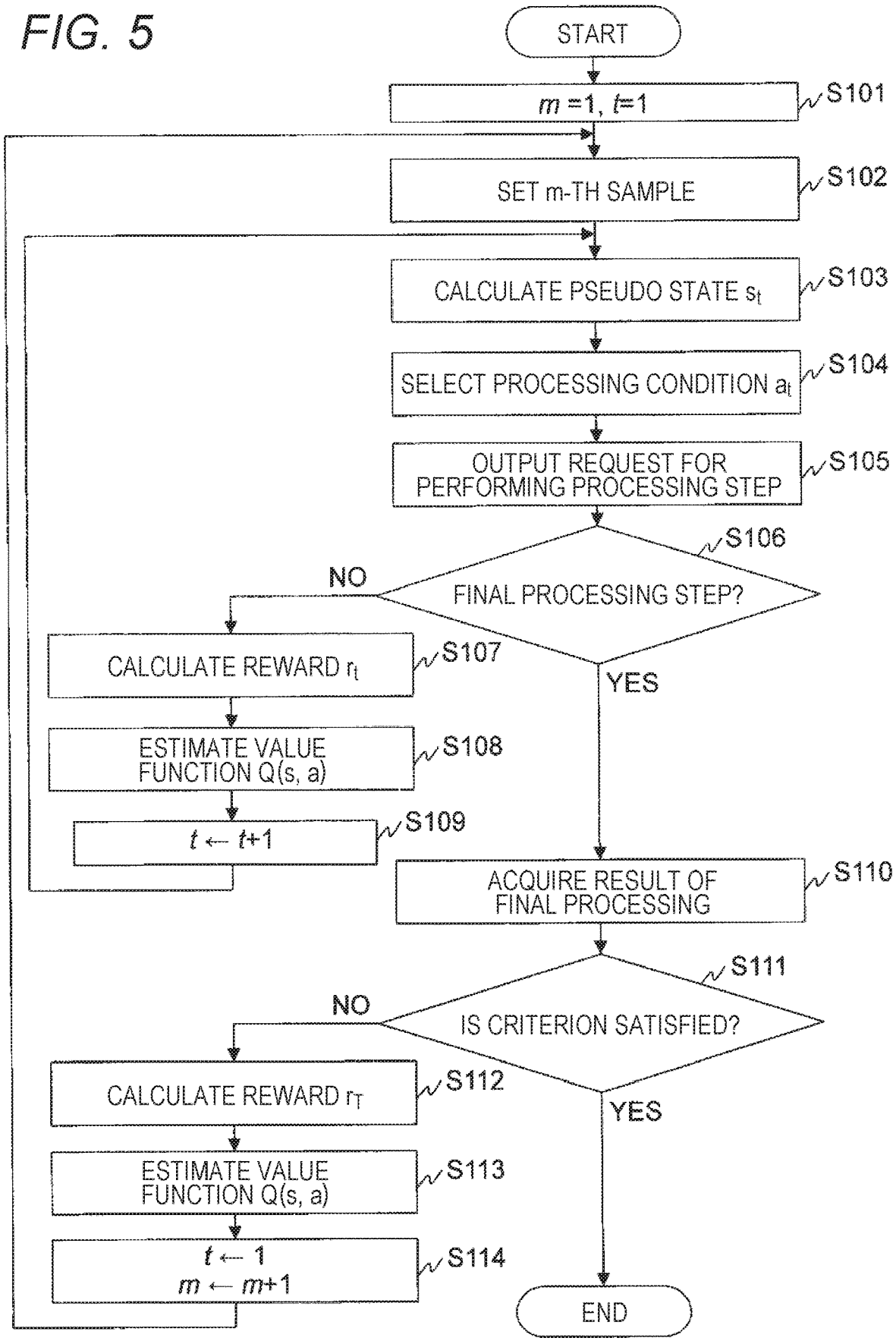
FIG. 5 is a flowchart illustrating processing performed by an analysis system according to the first embodiment.
Figure 6:
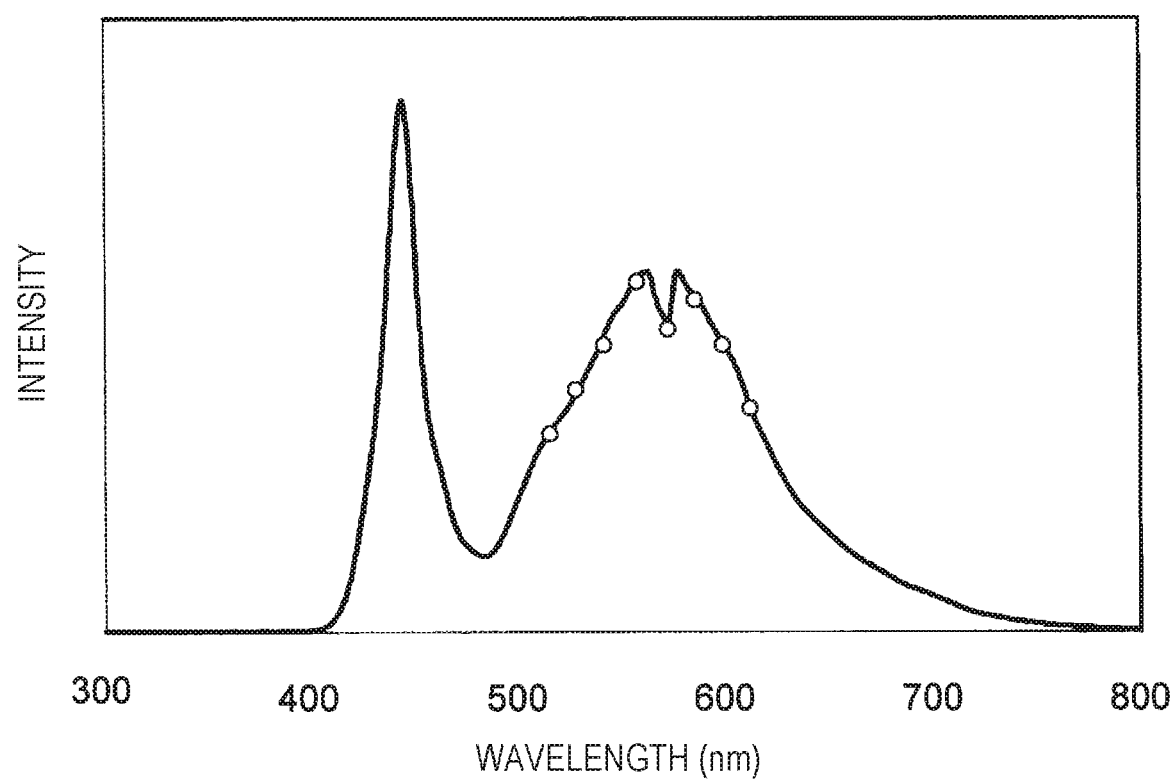
FIG. 6 is a graph illustrating an example of interference light measured by a measurement device according to the first embodiment.
Figure 8:
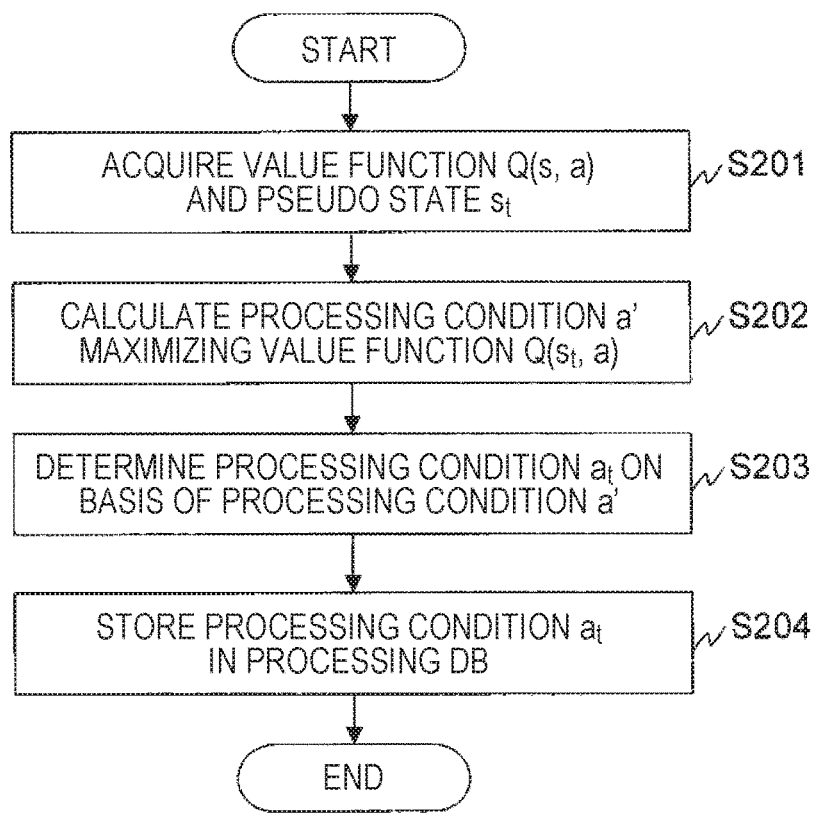
FIG. 8 is a flowchart illustrating processing performed by a processing condition analysis unit according to the first embodiment.
Figure 9A:
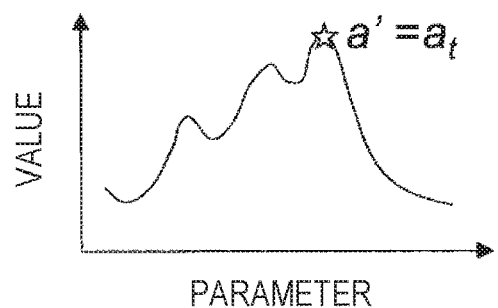
FIG. 9A is a graph illustrating an example of a selection method for a processing condition according to the first embodiment.
Figure 9B:
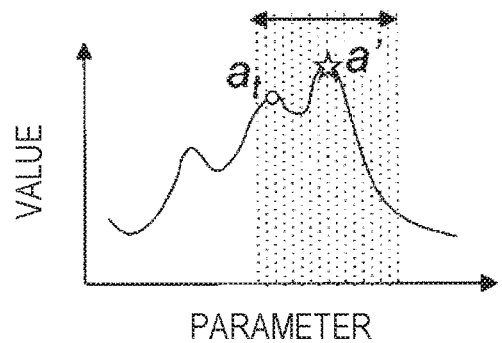
FIG. 9B is a graph illustrating an example of the selection method for a processing condition according to the first embodiment.

FIG. 5 is a flowchart illustrating processing performed by an analysis system 20 according to the first embodiment. FIG. 6 is a graph illustrating an example of interference light measured by the measurement device 103 according to the first embodiment. FIGS. 7A and 7B are tables each illustrating an example of a data structure of a pseudo state calculated by the pseudo state calculation unit 120 according to the first embodiment. FIG. 8 is a flowchart illustrating processing performed by the processing condition analysis unit 123 according to the first embodiment. FIGS. 9A and 9B are graphs each illustrating an example of a selection method for a processing condition according to the first embodiment.

The analysis system 20 sets "1" as an initial value to a variable m and a variable t (step S101). The variable m is a variable representing an identification number of a sample processed according to a processing procedure. The variable t is a variable representing an identification number of a processing step included in the processing procedure. The variable t is a natural number equal to or less than T.

The analysis system 20 sets an m-th sample in the semiconductor processing apparatus 10 (step S102). The variable m is a natural number.

Specifically, the analysis system 20 conveys the m-th sample to the semiconductor processing apparatus 10 and sets the sample into a state in which processing of the sample and measuring a physical quantity of the sample are enabled. At this time, the analysis system 20 generates processing information 400 associated with the value of the variable m, in the processing DB 130.

Next, the analysis system 20 calculates a current pseudo state st by using a physical quantity measured by the measurement device 103 (step S103).

Specifically, the pseudo state calculation unit 120 calculates the pseudo state from the physical quantity measured by the measurement device 103, and outputs the pseudo state to the reward calculation unit 121 and the processing condition analysis unit 123. Furthermore, the pseudo state calculation unit 120 adds an entry to the processing DB 130 and sets the value of the variable t to a processing step 401 of the added entry. Furthermore, the pseudo state calculation unit 120 sets the calculated pseudo state in a pseudo state 402 of the added entry.

For example, when acquiring a result of the measurement of interference light as illustrated in FIG. 6, the pseudo state calculation unit 120 calculates, as the pseudo state, a vector having an element which represents an intensity of a specific wavelength, as illustrated in FIG. 7A. Furthermore, Furthermore, the pseudo state calculation unit 120 performs a principal component analysis on a vector illustrated in FIG. 7A and calculates, as the pseudo state, a vector having elements which represent a predetermined number of principal components as illustrated in FIG. 7B. Note that the pseudo state calculation unit 120 may perform data standardization to calculate the pseudo state.

Note that it is assumed that a method of calculating the pseudo state from the physical quantity is set in the pseudo state calculation unit 120 in advance.

Next, the analysis system 20 selects an appropriate processing condition at in the current pseudo state st (step S104). Here, selection of the processing condition at will be described with reference to FIGS. 8 and 9.

The processing condition analysis unit 123 acquires the current pseudo state st from the pseudo state calculation unit 120 and further acquires a value function Q(s,a) from the value function information 131 (step S201).

Next, the processing condition analysis unit 123 calculates a processing condition a' maximizing a value function Q(st, a) obtained by substituting the current pseudo state st for a variable s (step S202).

As a method of calculating the processing condition a' maximizing the value function Q(st, a), use of a method, such as nonlinear programming, a metaheuristic, or a graph theory, is considered.

Next, the processing condition analysis unit 123 determines an appropriate processing condition at on the basis of the processing condition a' (step S203).

For example, as illustrated in FIG. 9A, the processing condition analysis unit 123 determines the processing condition a' as the processing condition at. As another determination method, the processing condition analysis unit 123 stochastically selects the processing condition at on the basis of the processing condition a'. Specifically, as illustrated in FIG. 9B, the processing condition analysis unit 123 sets a range of a predetermined size centered on the processing condition a' and randomly selects the processing condition at within the range.

The reason for stochastic selection of the processing condition at is to avoid the risk of generation of a local solution as a result of learning by a selection method for a definitive processing condition.

Next, the processing condition analysis unit 123 stores the processing condition at in the processing DB 130 (step S204). More specifically, the processing condition analysis unit 123 retrieves an entry having a processing step 401 matching the value of the variable t and stores the processing condition at in a processing condition 403 of the retrieved entry. This is the end of a description of the process of step S104. Description returns to FIG. 5.

Next, the analysis system 20 outputs a request for performing a processing step including the processing condition at to the semiconductor processing apparatus 10 (step S105).

Specifically, the processing condition analysis unit 123 outputs the request for performing the processing step including the processing condition at to the semiconductor processing apparatus 10 via the interface 102. Upon receiving the request for performing the processing step, the semiconductor processing apparatus 10 performs processing on the sample on the basis of the processing condition at included in the request.

Next, the analysis system 20 determines whether the current processing step is the final processing step (step S106).

Specifically, the analysis system 20 determines whether the value of the variable t is T or not. When it is determined that the value of the variable t is T, the analysis system 20 determines that the current processing step is the final processing step.

When it is determined that the current processing step is not the final processing step, the analysis system 20 calculates a reward rt (step S107). Specifically, the following processing is performed.

The reward calculation unit 121 calculates the reward rt on the basis of the pseudo state acquired from the pseudo state calculation unit 120. In the first embodiment, the reward rt is calculated on the basis of the frequency of the interference light. The frequency of the interference light in a time direction is a physical quantity correlating with an amount of change in the film thickness of the sample. Therefore, the greater the frequency is, the deeper the depth of a groove of the sample is. Therefore, the reward calculation unit 121 calculates the reward according to the frequency of the interference light. This is the end of a description of the process of step S107.

Next, the analysis system 20 estimates a value function Q(s,a) on the basis of the processing DB 130 (step S108).

For example, the value function Q(s,a) is estimated by using machine learning, such as reinforcement learning, a recurrent neural network (RNN), linear regression, neural network (NN), and kernel ridge regression (KRR).

Note that the value function does not need to be estimated for each processing step. For example, when a certain number of processing steps are finished or when processing of a plurality of samples is finished, the analysis system 20 may estimate the value function. The reason why the value function is estimated after a certain number of data is accumulated is because the estimation accuracy of the value function sometimes improves as the number of data used for estimation increases.

Next, the analysis system 20 sets a value obtained by adding 1 to the variable t, as a new variable t (step S109) and then returns to step S103. That is, the processing proceeds to the next processing step.

In step S106, when it is determined that the current processing step is the final processing step, the analysis system 20 directly acquires a result of the processing indicating a state of the sample from the sample after all the processing steps have been performed (Step S110).

For example, the analysis system 20 acquires cross-sectional information of the sample conveyed outside the semiconductor processing apparatus 10 by using a scanning electron microscope. Note that the analysis system 20 may acquire the pseudo state as a result of the processing, by using the measurement device 103.

Next, on the basis of the acquired result of the processing, the analysis system 20 determines whether the processed sample satisfies a criterion (step S111).

For example, the analysis system 20 determines whether an error between a processed shape of the sample and a target processed shape is within a preset error range. For the criteria of the sample, different criteria can be set depending on the processed shape and processing purpose.

When it is determined that the processed sample satisfies the criterion, the analysis system 20 finishes the processing. This means determination of the processing conditions of each processing step of the processing procedure according to which the sample satisfying the criteria is obtained. At this time, the analysis system 20 may acquire processing information 400 corresponding to this processing procedure from the processing DB 130 and generate display information for presenting the processing information 400 to the user.

When it is determined that the processed sample does not satisfy the criterion, the analysis system 20 calculates a reward rT (step S112).

The method of calculating the reward is the same as that in step S107. At this time, the analysis system 20 searches for an entry having a processing step 401 being T and sets the calculated reward rT in a reward 404 of the retrieved entry.

Next, the analysis system 20 estimates a value function Q(s,a) on the basis of the processing DB 130 (step S113). The method of estimating the value function is the same as that of step S108.

Next, the analysis system 20 initializes the variable t to 1, sets a value obtained by adding 1 to the variable m as a new variable m (step S114), and then returns to step S102. That is, reinforcement learning using a next sample is started.

Performing the processing illustrated in FIG. 5, it is possible to determine a processing procedure including processing steps controlled on the basis of appropriate processing conditions.

Note that the reward rt does not need to be calculated for each processing step. In this case, the value function Q(s,a) is estimated on the basis of the reward rT as well as the pseudo state and processing condition of each processing step, without performing the processing of steps S107 and S108.

Note that when the reward rt can be calculated on the basis of the pseudo state and the reward rT can be calculated on the basis of the final processed shape of the sample, the analysis system 20 may treat the two rewards as one reward.

FIG. 10 is a diagram illustrating an example of a GUI 1000 for various settings of the analysis system 20 according to the first embodiment.

The GUI 1000 is a GUI used for various settings for learning. The GUI 1000 includes a learning process setting field 1010, a pseudo state setting field 1020, a reward setting field 1030, a processing procedure setting field 1040, a value function update setting field 1050, and an enter button 1070.

The learning process setting field 1010, the pseudo state setting field 1020, the reward setting field 1030, the processing procedure setting field 1040, and the value function update setting field 1050 each include a lamp 1060 indicating whether input to the field is valid. When an input to a field is valid, a lamp 1060 is lit. Thus, the user can confirm that a correct value is input. Note that in addition to the lamp 1060, pop-up display and sound reproduction may be performed.

The learning process setting field 1010 includes a value function field 1011 and a reinforcement learning field 1012. The value function field 1011 is a field for setting a value function (model) and includes check boxes for selecting any of linear regression, neural network (NN), and kernel ridge regression (KRR). The reinforcement learning field 1012 is a field for setting a reinforcement learning method and includes check boxes for selecting any of Q-learning, SARSA, and Actor-Critic.

The pseudo state setting field 1020 includes a pseudo state field 1021. The pseudo state field 1021 is a field for setting a value to be calculated as the pseudo state and includes check boxes for selecting any of the intensity of interference light of a specific wavelength, a value obtained by applying PCA to the intensity of light of a specific wavelength, and a physical quantity measured by the measurement device 103. Note that the pseudo state setting field 1020 may include a field for the user to directly define the pseudo state.

The reward setting field 1030 includes a reward field 1031. The reward field 1031 is a field for setting a method of calculating the reward and includes check boxes for selecting any of the frequency of interference light, the processed shape of the sample after the end of a processing procedure, and a combination thereof. Note that the reward setting field 1030 may include a field for the user to directly define the reward.

The processing procedure setting field 1040 includes a processing procedure field 1041. The processing procedure field 1041 is a field for setting about the processing procedure and includes a field for setting the number of processing steps included in the processing procedure and the processing time of the processing procedure. Note that the processing procedure setting field 1040 may include a field for the user to directly define the processing procedure.

The value function update setting field 1050 includes an update frequency field 1051. The update frequency field 1051 is a field for setting estimation timing to estimate the value function and includes check boxes for selecting any of every processing step, every sample, and every certain number of samples. When the value function is estimated every certain number of samples, the user sets a value in a field used for specifying the number of samples.

The enter button 1070 is a button for entering the values in the fields. Note that the enter button 1070 may be controlled to be operated only when a lamp 1060 in each field is lit. When the user presses the enter button 1070, the analysis system 20 starts the processing illustrated in FIG. 5.

The check boxes in the respective fields are merely examples, and a check box for selecting a format or method not illustrated may be included.

As described above, when a state of an environment (a sample in the semiconductor processing apparatus 10) in reinforcement learning cannot be directly observed, the analysis system 20 according to the first embodiment performs the reinforcement learning on the basis of a pseudo state calculated from a physical quantity strongly correlating with the state of the environment. Accordingly, the analysis system 20 can determine an appropriate processing condition for each processing step included in a processing procedure. In addition, since the reinforcement learning uses the pseudo state, it is possible to achieve real-time control without taking out the sample from the semiconductor processing apparatus 10.

In the present embodiment, an example of the reinforcement learning using the pseudo state calculated from interference light has been described, but the present invention is not limited thereto. For example, similar reinforcement learning can be achieved by using a physical quantity showing an electrical characteristic, mechanical characteristic, or the like as the physical quantity correlating with a state, such as a physical property, shape, or color.

It should be noted that the invention described in the first embodiment can be applied also to reinforcement learning other than the reinforcement learning for determining a processing procedure for a sample. That is, the present invention can be applied to an optimization problem by which a physical quantity correlating with a state is acquired.

Note that the present invention is not limited to the above embodiments and includes various modifications. Furthermore, for example, in the above embodiments, configurations are described in detail for ease of understanding the present invention, and therefore, the present invention is not necessarily limited to a configuration including all of the configurations described above. Still furthermore, addition, elimination, or substitution of part of the configuration of each of the embodiment may be made with respect to another configuration.

In addition, the configurations, functions, processing units, processing means, and the like described above may be partially or wholly achieved by hardware, such as a designed integrated circuit. Furthermore, the present invention can be also achieved by software program codes which achieve functions of the embodiments. In this configuration, a storage medium recording the program codes is provided to a computer, and a processor included in the computer reads the program codes stored in the storage medium. In this case, the program codes themselves read from the storage medium achieve the functions of the embodiments described above, and the program codes themselves and the storage medium storing the program codes constitute the present invention. As the storage medium for supplying such program codes, for example, a flexible disk, CD-ROM, DVD-ROM, hard disk, solid state drive (SSD), optical disk, magneto-optical disk, CD-R, magnetic tape, nonvolatile memory card, ROM, or the like is used.

In addition, program codes for achieving the functions described in the present embodiment can be implemented in a wide range of program languages or script languages, such as assembler, C/C++, perl, Shell, PHP, and Java (registered trademark).

Furthermore, the software program codes achieving the functions of the embodiments may be delivered via a network and stored in storage means, such as a hard disk or memory of a computer, or a storage medium, such as a CD-RW or a CD-R so that the program codes stored in the storage means or storage medium is read and executed by a processor of the computer.

In the above embodiments, control lines or information lines considered necessary for description are described, and not necessarily all the control lines or information lines required for a product are shown. All the configurations may be mutually connected.

What is claimed is:

1. A system for determining a processing procedure including a plurality of processes for controlling an object, the system comprising:
    at least one computer including an arithmetic device, a storage device connected to the arithmetic device, and an interface connected to the arithmetic device, wherein
    the plurality of processes is each performed on the basis of a preset processing condition, and
    the at least one computer is configured
        to perform a learning process for determining the preset processing condition of each of the plurality of processes,
        to acquire, from a device for controlling the object on the basis of the processing procedure, a physical quantity correlating with a state of the object for which a process included in the processing procedure is performed under a predetermined processing condition to calculate a pseudo state corresponding to the state of the object in reinforcement learning,
        to determine a processing condition of each of the plurality of processes for achieving a target state of the object by using a value function for outputting a value indicating an evaluation of the processing condition selected in an appropriate pseudo state,
        to acquire the physical quantity to calculate the pseudo state on the basis of the physical quantity,
        to select an appropriate processing condition from among the processing conditions of the process performed next, on the basis of the pseudo state and the value function,
        to output a request for performing processing including the selected processing condition to the device, and
        to acquire the physical quantity from the device having performed a process on the basis of the request for performing processing and to calculate the pseudo state, and
    wherein
    the object is a semiconductor processing apparatus for manufacturing a semiconductor by processing a sample, and
    the processing condition is a condition for controlling the semiconductor processing apparatus.

2. The system according to claim 1, wherein
    the at least one computer is further configured to calculate at least any of a value for evaluating the process on the basis of the pseudo state after performance of a process in which an appropriate processing condition is set, and a value for evaluating the processing procedure on the basis of a shape of the sample on which all of the processes of the processing procedure have been performed, and
    to calculate a value function analysis unit configured to update the value function on the basis of the pseudo state upon performance of each of the plurality of processes, the processing condition set for each of the plurality of processes, and the reward.

3. The system according to claim 1, wherein
    the physical quantity is a value relating to light measured by irradiating the sample placed in the semiconductor processing apparatus with light.

4. The system according to claim 1, wherein
    the at least one computer calculates the pseudo state by performing a dimension reduction process using the physical quantity.

5. The system according to claim 1, wherein
    the at least one computer selects the processing condition maximizing a value calculated according to the value function in which the calculated pseudo state is input, by using at least any of a nonlinear programming method, a metaheuristic, and a graph theory.

6. A method of determining a processing condition set in a plurality of processes included in a processing procedure for controlling an object, the method being performed by a system,
    the system including at least one computer having an arithmetic device, a storage device connected to the arithmetic device, and an interface connected to the arithmetic device,
    the plurality of processes each performed on the basis of a preset processing condition,
    the method of determining the processing condition comprising:
        a first step of acquiring a physical quantity correlating with a state of the object for which one process included in the processing procedure has been performed under a predetermined processing condition from a device for controlling the object on the basis of the processing procedure to calculate a pseudo state corresponding to the state of the object in reinforcement learning on the basis of the physical quantity, by using the at least one computer; and
        a second step of determining a processing condition of each of the plurality of processes for achieving a target state of the object by using a value function using the pseudo state and processing condition as variables to output a value indicating an evaluation of the processing condition selected in an appropriate pseudo state, by using the at least one computer,
    wherein the second step includes
        selecting an appropriate processing condition from among the processing conditions of the process performed next on the basis of the value function and the pseudo state, by using the at least one computer, and
        outputting a request for performing processing including the selected processing condition to the device, by using the at least one computer, and the first step includes acquiring the physical quantity from the device having performed a process on the basis of the request for performing processing, by using the at least one computer, and wherein the object is a semiconductor processing apparatus for manufacturing a semiconductor by processing a sample, and the processing condition is a condition for controlling the semiconductor processing apparatus.

7. The method of determining a processing condition according to claim 6, further comprising:

calculating, as a reward, at least any of a value for evaluating a process in which an appropriate processing condition is set, on the basis of the pseudo state after performance of the process, and a value for evaluating the processing procedure on the basis of a shape of the sample after performance of all of the processes in the processing procedure, by using the at least one computer; and updating the value function on the basis of the pseudo state upon performance of each of the plurality of processes, the processing condition set for each of the plurality of processes, and the reward, by using the at least one computer.

8. The method of determining a processing condition according to claim 6, wherein the physical quantity is a value relating to light measured by irradiating the sample placed in the semiconductor processing apparatus with light.

9. The method of determining a processing condition according to claim 6, wherein the first step includes calculating the pseudo state by performing a dimension reduction process using the physical quantity, by using the at least one computer.

10. The method of determining a processing condition according to claim 6, wherein the at least one computer selects the processing condition maximizing a value calculated according to the value function in which the calculated pseudo state is input, by using at least any of a nonlinear programming method, a metaheuristic, and a graph theory.

* * * * *